United States Patent [19]

Chevalier

[11] Patent Number: 4,660,931
[45] Date of Patent: Apr. 28, 1987

[54] FOLDABLE STEREO VIEWER

[75] Inventor: Louis Chevalier, Nice, France

[73] Assignee: Stereoscopes Lestrade & Cie, S.A., Vic-En-Bigorre, France

[21] Appl. No.: 617,678

[22] Filed: Jun. 6, 1984

[30] Foreign Application Priority Data

Jan. 24, 1984 [FR] France .................................. 84 01055

[51] Int. Cl.⁴ ............................................ G02B 27/22
[52] U.S. Cl. ..................................................... 350/140
[58] Field of Search ................................ 350/140, 133

[56] References Cited

U.S. PATENT DOCUMENTS

| | | | |
|---|---|---|---|
| 2,724,991 | 11/1955 | Levine | 226/41 |
| 2,809,452 | 10/1957 | Brown | 40/365 |
| 2,906,170 | 9/1959 | Kiehl et al. | 350/140 |
| 2,986,830 | 6/1961 | Underberg et al. | 350/140 |
| 3,462,210 | 8/1969 | Monzali | 350/140 |
| 3,562,939 | 2/1971 | Jacobs et al. | 40/365 |
| 3,734,596 | 5/1973 | Nerlich | 350/140 |
| 3,756,699 | 9/1973 | Martin | 350/250 |
| 4,253,732 | 3/1981 | Carver | 350/140 |
| 4,357,073 | 11/1982 | Carver | 350/140 |

FOREIGN PATENT DOCUMENTS 1461824 12/1966 France .
813466 5/1959 United Kingdom .

Primary Examiner—John K. Corbin
Assistant Examiner—Scott J. Sugarman
Attorney, Agent, or Firm—D. Peter Hochberg

[57] ABSTRACT

A stereo viewer comprises front and rear sides joined by a common hinge, with intermediate hinges. The front side has a zone with a pair of spaced apart lenses and the rear side has a zone with stereopair in windows. In the storage position the front and rear sides are flat and in the operative position the lenses and the stereopair are in optical alignment. A positioning member is received between the front and rear sides and provides an abutment against the common hinge for determining the operative or viewing position. The front and rear sides and the positioning member may be made of a single sheet of paperboard and the stereo viewer used as a 3-D postcard.

10 Claims, 7 Drawing Figures

FOLDABLE STEREO VIEWER

BACKGROUND OF THE INVENTION

The present invention relates generally to a foldable stereo viewer having a stereopair.

Foldable stereo viewers for viewing stereopairs arranged on a card adapted to be displaced into alignment with a corresponding pair of windows and a pair of lenses are known.

OBJECT AND SUMMARY OF THE INVENTION

An object of the present invention is to provide a compact and lightweight foldable stereo viewer having a flat storage position and an operative or viewing position and readily changeable from the storage position to the operative or viewing position.

Another object of the present invention is a compact and lightweight foldable stereo viewer card adapted to be received in an envelope and sent through the mails as a card.

According to the invention there is provided a foldable stereo viewer permanently equipped with a stereopair.

According to the present invention there is provided a compact and lightweight foldable stereo viewer which comprises a front side and a rear side joined to each other. Each of the sides is transversely divided into two zones, a first of the zones of the front side mounts a pair of spaced apart lenses and a first of the zones of the rear side mounts a stereopair having substantially the same spacing as the pair of lenses. The stereo viewer has a storage position in which the front and rear sides lie substantially flat and an operative or viewing position in which the first zones are disposed spaced from each other and the lenses and the stereopair are in optical alignment.

According to further feature of the invention the front and rear sides and/or the zones of each of the sides are joined together by hinges. Preferably, the front and rear sides are made of sheet material and the hinges are defined by score lines.

According to an additional feature of the invention a positioning member is mounted between the front and rear faces and lies generally parallel thereto in the storage position and is inclined relative to the front and rear sides to define the operative or viewing position. Preferably the positioning member is adapted to abut against the junction between the front and rear sides and is attached to the front and rear sides at a location remote from the junction.

According to a preferred embodiment the zones of each of the sides are rectangular, the first zone of the front side and the first zone of the rear side being of the same dimensions, and the positioning member lies along the diagonal of the boxlike space defined by the front and rear sides when the stereo viewer is in its operative or viewing position.

According to a preferred embodiment, the front and rear sides of the stereo viewer card are formed in a single sheet of material with score lines defining hinges between the zones, adjacent zones of the opposed sides remote from the junction having terminal margins between which a corresponding margin of the positioning member is received, the sheet of material being secured together along the margins.

The stereo viewer of the present invention thus provides a stereo viewing arrangement with its own stereopair at a much lower cost than any known stereoscopes and is advantageously so lightweight (e.g. less than 20 grams) and compact so that it may be slipped into a standard type envelope, and easily and inexpensively sent through the mails. The stereo viewer can therefore be competitive with most greeting cards and some postcards.

These and other features and advantages of the stereo viewer card will be brought out in the description which follows, by way of example, with reference to the accompanying schematic drawings.

DESCRIPTION OF THE PREFERRED EMBODIMENTS

A first embodiment of the invention is illustrated in FIGS. 1-5 of the drawings. The stereo viewer is made of several plies of sheet material which is preferably paperboard or heavy paper. The plies of sheet material are preferably formed by single, continuous, folded, rectangular sheet or band.

Figure 1:
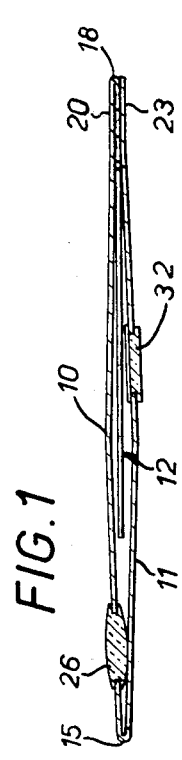
FIG. 1 is a cross-sectional view of a stereo viewer taken along the line I—I in FIG. 2.
Figure 2:
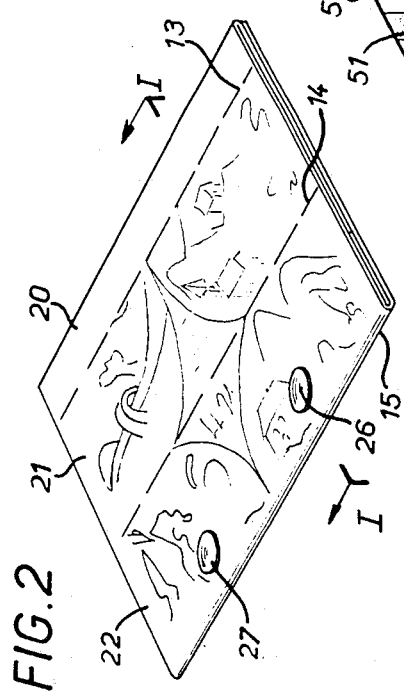
FIG. 2 is a perspective view of the front side and a lateral edge of the stereo viewer in its flat, storage position.
Figure 3:
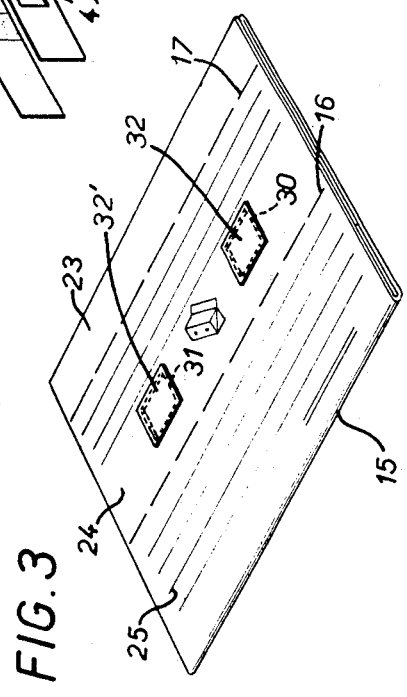
FIG. 3 is a perspective view similar to that of FIG. 2 of the rear side and a lateral edge of the stereo viewer in its flat, storage position.

The stereo viewer comprises a front side or panel 10, a rear side or panel 11 and preferably a third panel or positioning member 12 extending between or interleaving the front and rear sides 10, 11 (FIG. 1). The front and rear sides 10 and 11 are joined together by a transverse hinge or score line 15. The front and rear sides 10 and 11 are both preferably rectangular and of equal dimensions. Remote from the transverse hinge 15 the front side 10 has a front margin 20 and the rear side 11, a rear margin 23. The third panel 12 has a corresponding margin 12' sandwiched between front and rear margins 20 and 23. Preferably, as illustrated, the third panel margin 12' is joined by a fold line or score line to the front margin 20. Alternatively, it may be joined by a fold line or score line to the rear margin 23 or even separate from both the front and rear margins 20, 23, in which case the stereo viewer would be comprised of two independent or separate sheets or parts. The margins 20, 23 and 12' are preferably assembled by pressure and heat sensitive adhesive bonding. In addition to or in lieu of adhesive bonding fasteners such as staples may be used.

The front side or panel 10 per se of the viewer is thus defined between the hinge or score line 15 and the hinge or score line 13 adjoining the front margin 20, and likewise the rear side or panel 11 per se of the viewer is thus defined between the hinge or score line 15 and the hinge or score line 17 adjoining the rear margin 23. The front side or panel 10 has an intermediate hinge or score line 14 dividing the front side or panel 10 into two zones: a lens mounting zone 22 and a connecting zone 21. In the FIGS. 1-5 these zones are of equal dimensions. Similarly, the rear side or panel 11 has an intermediate hinge or score line 16 dividing the rear side or panel 11 into two zones: a stereopair mounting zone 24 and a connecting zone 25. Again, in the FIGS. 1-5 embodiment the zones of the rear side are of equal dimensions and of the same size as the zones of the front side.

The lens mounting zone 22 has a pair of simple plastic lenses 26 and 27 fitted in holes of complementary configuration. The spacing between the axes of the lenses 26 and 27 corresponds to the average human interpupil spacing.

According to a preferred method of assembly, the plastic lenses 26 and 27 are initially of the same diameter as their respective holes and are brought into position in their corresponding holes by opposed plungers (not shown) which heat the outer periphery of the opposite faces of the lenses to their softening point and flange them against the edge portions around holes. The lenses 26 and 27 are allowed to cool, bonding themselves to lens mounting zone 22. The lenses are thus firmly secured in their respective holes.

A stereopair 28, 29 are arranged in windows 30, 31 cutout of the stereopair mounting zone 24 and a translucent diffuser 32, 32' is fitted in each of the corresponding windows 30, 31. The diffusers 32, 32' may be secured in windows 30, 31 in the same way as lenses 26 and 27, described above.

The stereopair 28, 29 comprise a pair of transparencies taken with a suitable stereo still camera as is known in the art. Transparencies permit the images to be viewed in normal ambient light. The transparencies are preferably slightly larger than the windows 30, 31 and may be heat sealed thereto. The diffusers 32, 32', in addition, protect the transparencies from, for example, dust, scratching and puncture.

Alternatively, suitable stereopair subassemblies may be cut transversely from conventional stereocards such as used with present-day stereo viewers, to the rear of which a sheet of PVC is heat sealed or bonded to define diffusers therefor.

Figure 6:
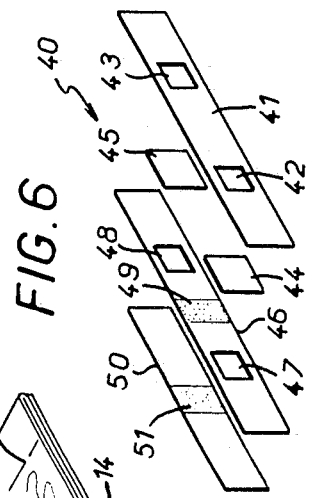
FIG. 6 is an exploded perspective view of a stereopair subassembly adapted to be used in the stereoviewer of FIGS. 1-5.

An exploded view of such a stereopair subassembly 40 is illustrated in FIG. 6. The stereopair subassembly 40 comprises a front mount 41 of paperboard having rectangular apertures 42, 43 of size and spacing corresponding to the windows 30, 31 in the stereopair mounting zone 24, an identical rear mount 46 of paperboard having rectangular apertures 47, 48 and stereo transparencies 44 and 45 in alignment with pairs of apertures 41, 48 and 42, 47. A PVC sheet 50 defining diffusers is arranged on the outer side of the rear mount 46. A suitable adhesive at 49 secures the front and rear mounts 41, 46 together and at 51 the PVC sheet 50 to the rear mount. The transparencies are held in place along their peripheral margins by adhesive bonding or heat sealing to one of the mounts 41 or 45. The entire stereopair subassembly 40 may then be adhesive bonded to the stereopair mounting zone 24 with the transparencies 44 and 45 in alignment with the windows 30, 31. It is readily appreciated that other means of mounting stereopairs may be utilized. By the same token stereopairs other than transparencies may be employed.

As noted above the front and rear sides 10 and 11 of the stereo viewer are preferably made of a single sheet or band of paperboard with a plurality of score lines corresponding to hinges 13, 14, 15, 16 and 17. The adhesive for bonding the margins 20, 23 and 12' as well as the stereopairs to the stereopair mounting zone 24 is preferably applied to precut and scored paperboard blanks. The remaining parts are preferably coated with a nonstick ink to prevent sticking of the blanks prior to use. Also, the nonstick ink for the interior parts of the resulting stereo viewer is preferably of a dark color which absorbs light and thus enhances viewing of the stereopair.

Figure 4:
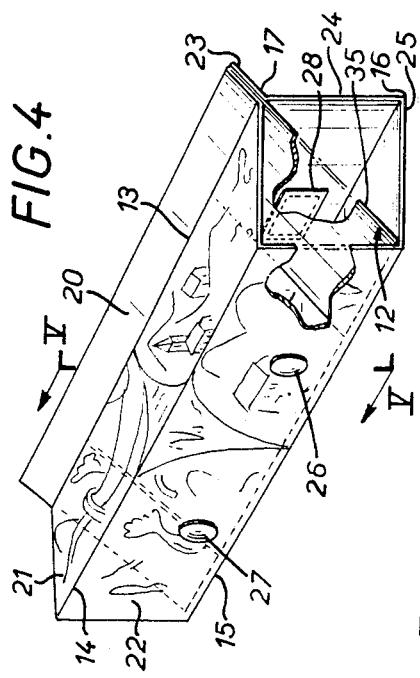
FIG. 4 is a perspective view of the stereo viewer of FIGS. 1-3 in its operative or viewing position.
Figure 5:
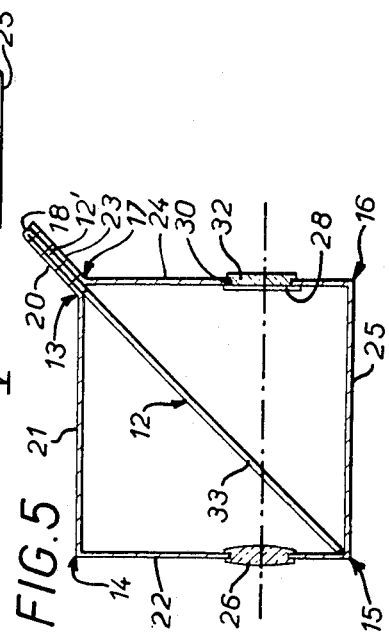
FIG. 5 is a cross-sectional view of the stereo viewer taken along line V—V in FIG. 4.

The third panel or positioning member 12 preferably comprises a pair of legs 35 depending from the transverse margin 12', with a large cutout area 33 extending from the margin 12' and between legs 35. The viewing or operative position of the stereo viewer card as illustrated in FIG. 5 is determined by the height of the positioning member 12 namely legs 35. The free transverse edge of the legs 35 of positioning member 12 comes into abutment with the hinge or score line 15 between the front and rear sides 10, 11. As shown in FIG. 5, the positioning member 12 defines the diagonal of the rectangular box formed by the front and rear sides 10, 11 of the viewer The lens mounting zone 22 and the stereopair mounting zone 24 are substantially parallel and spaced apart as are the two connecting zones 21 and 25, in the viewing or operative position of the viewer. In this position the lenses 26 and 27 are in optical alignment with the images of the stereopair 32, 32' through the cutout area 33 in the positioning member 12.

For bringing the stereo viewer card from the storage position of FIG. 1 to the operative or viewing position of FIG. 5, the user simply urges the score line or hinge 15 inwardly i.e. towards the free transverse edge of the positioning member 12, until score line or hinge 15 abuts against the free transverse edge of the positioning member 12. Thereupon slight pressure is maintained to keep the card in its operative or viewing position. After viewing the stereo viewer card may simply be flattened again and inserted into an envelope for storage.

In the FIGS. 1-6 embodiment the cross sectional length of each of the four zones 21, 22, 24 and 25 of the front and rear sides or panels 10, 11 is substantially equal.

Figure 7:
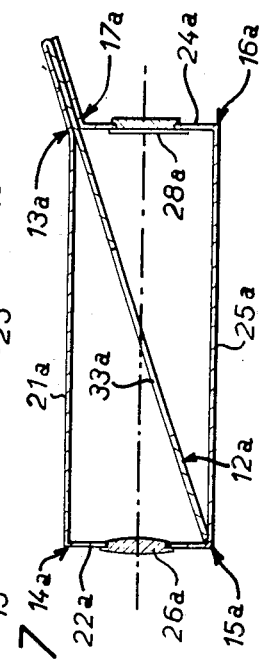
FIG. 7 is a cross-sectional view illustrating another embodiment of the stereo viewer according to the invention.

Alternatively, other arrangements are possible, for example the lens mounting zone and the stereopair mounting zone may be shorter than the connecting zones therebetween. Such as arrangement is illustrated in FIG. 7. The lens mounting zone 22a defined between score lines 14a and 15a and the stereopair mounting zone 24a between score lines 16a and 17a are substantially of the same height and shorter than the connecting zones 21a and 25a between the score lines 14a and 13a and 15a and 16a, respectively. Such an arrangement provides a greater optical distance between the lens 26a and the transparencies of the stereopair of which only 28a is shown.

In the FIG. 7 embodiment the third panel or positioning member does not comprises a pair of legs as in the FIGS. 1-6 embodiment but merely a pair of apertures 33a, of which only one is shown, in optical alignment with the corresponding lenses and stereopair, as represented by the dotted line in FIG. 7.

According to yet another embodiment, not illustrated, the length of lens mounting zone and the stereopair mounting zone, in cross section, is greater than that of the connecting zones extending between the lens mounting zone and the stereopair mounting zone. Such an arrangement which may be preferred, obviously reduces the optical distance between the lenses and the stereopair for given overall viewing dimensions. In this respect a preferred arrangement is where the length of the lens mounting or stereoscope mounting zone in cross section is equal to the sum of the length of the front connecting zone and the adjoining front margin in cross section.

The front side or panel may bear one of prints or images which correspond to the image defined by the stereopair.

Although the stereo viewer of the present invention is particularly well suited for use as a 3-D picture postcard it may have other uses, for example, for promotional or advertising purposes, or even games.

It will be understood to those skilled in the art that the present stereo viewer card admits of various modifications and alternatives without departing from the spirit and scope of the invention.

What I claim is:

1. A foldable stereo viewer card comprising rectangular front and rear sides of sheet material joined at one end by a common transverse hinge, each of said front and rear sides being divided into two rectangular zones by a transverse intermediate hinge, each of said sides having another hinge remote from said common hinge at the junction with a transverse margin, the transerve margins being disposed in spaced overlying relation, a first of said zones of said front side mounting a pair of spaced apart lenses and a first of said zones of said rear side having windows for receiving a stereopair aligned with said windows, said stereopair having substantially the same spacing as said pair of lenses, a second of said zones of one of said sides being a connecting zone between its other hinge and said one side, and a second of said zones of said other side being a connecting zone between said first zone of said other side and said common hinge, a positioning member having a transverse margin sandwiched between the terminal margins of front and rear sides, means securing said transverse margins together, said positioning member extending between the front and rear sides and having a free end adapted to abut the common hinge, said stereo viewer card having an operative position in which the free end of said positioning member abuts against the common hinge and the lenses are in optical alignment with the stereopair, and a storage position for insertion into an envelope in which the entire front and back sides and said positioning member lie in substantitally flat, overlying relation.

2. A stereo viewer according to claim 1, wherein said positioning member comprises a pair of transversely spaced legs depending from its transverse margin, and an open area between said legs for permitting viewing of said stereopair through said positioning member in the operative or viewing position of said stereo viewer.

3. A stereo viewer according to claim 1, wherein said positioning member comprises a pair of openings in alignment with said lenses and stereopair in the operative or viewing positioning of said stereo viewer.

4. A stereo viewer according to claim 1, wherein said front and rear sides and said positioning member are part of one-piece sheet material construction.

5. A stereo viewer according to claim 4, wherein said transverse margin of said positioning member is in one-piece with said transverse margin of one of said front and rear sides.

6. A stereo viewer according to claim 1, said margins being adhesive bonded together.

7. A stereo viewer according to claim 1, said lenses are heat sealed to regions defining holes in said lens mounting zone.

8. A stereo viewer according to claim 1, further comprising diffusers in said windows in said stereopair mounting zone overlying transparencies defining said stereopair.

9. A stereo viewer according to claim 1, wherein said stereopair is defined by a stereopair subassembly comprising a pair of aligned masks or mounts for receiving transparencies therebetween and a diffuser sheet overlying a rearward one of said masks, said stereopair subassembly being fixed to said stereopair mounting zone.

10. A stereo viewer according to claim 1, wherein said positioning member is cutout for permitting viewers of said stereopairs through said lenses.

* * * * *